US007675721B2

(12) United States Patent
Elms

(10) Patent No.: US 7,675,721 B2
(45) Date of Patent: Mar. 9, 2010

(54) CIRCUIT INTERRUPTER INCLUDING A SHUNT WIRE CURRENT SENSOR AND A PROCESSOR HAVING A THERMAL OVERLOAD PREDICTIVE FUNCTION

(75) Inventor: Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 476 days.

(21) Appl. No.: 11/549,164

(22) Filed: Oct. 13, 2006

(65) Prior Publication Data

US 2008/0088991 A1 Apr. 17, 2008

(51) Int. Cl.
*H02H 3/08* (2006.01)
*H02H 5/04* (2006.01)

(52) U.S. Cl. ......................... 361/42; 361/103; 361/93.8

(58) Field of Classification Search .................. 361/42, 361/103, 93.8
See application file for complete search history.

(56) References Cited

U.S. PATENT DOCUMENTS 3,736,468 A 5/1973 Reeves et al.
3,991,391 A 11/1976 Wafer
4,081,852 A 3/1978 Coley et al.
4,358,810 A 11/1982 Wafer et al.
4,487,063 A * 12/1984 Hopper .................... 73/204.19
4,829,218 A * 5/1989 Bauer ......................... 388/811
5,224,006 A 6/1993 MacKenzie et al.
5,260,676 A 11/1993 Patel et al.
5,293,522 A 3/1994 Fello et al.
5,418,677 A 5/1995 Engel
5,436,784 A * 7/1995 Schweitzer et al. ........... 361/25
5,459,630 A * 10/1995 MacKenzie et al. ........... 361/45
5,691,869 A 11/1997 Engel et al.
5,835,320 A 11/1998 Palmieri et al.
5,898,557 A * 4/1999 Baba et al. .................. 361/103
5,936,817 A * 8/1999 Matsko et al. ................. 361/72
6,137,386 A 10/2000 Mueller
6,876,532 B2 4/2005 Engel et al.
7,508,642 B2 * 3/2009 Ye ............................ 361/103

OTHER PUBLICATIONS

Poeth II, Make Your Own Shunts, online article www.uoguelth.ca/~antoon/gadgets/shunts.html, 1995, pp. 1-4.*

* cited by examiner

*Primary Examiner*—Stephen W Jackson
*Assistant Examiner*—Zeev Kitov
(74) *Attorney, Agent, or Firm*—Martin J. Moran

(57) ABSTRACT

A miniature circuit breaker includes separable contacts, an operating mechanism structured to open and close the separable contacts, a microprocessor including a thermal overload predictive function, and a shunt wire in series with the separable contacts. The shunt wire is structured to measure current flowing through the separable contacts for the thermal overload predictive function and an arc fault protective function.

3 Claims, 2 Drawing Sheets

2

CIRCUIT INTERRUPTER INCLUDING A SHUNT WIRE CURRENT SENSOR AND A PROCESSOR HAVING A THERMAL OVERLOAD PREDICTIVE FUNCTION

BACKGROUND OF THE INVENTION

1. Field of the Invention

This invention pertains generally to circuit interrupters and, more particularly, to circuit breakers including an electronic trip circuit and a trip actuator.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal which is heated and bends in response to a persistent overcurrent condition. The bimetal, in turn, unlatches a spring powered operating mechanism which opens the separable contacts of the circuit breaker to interrupt current flow in the protected power system. An armature, which is attracted by the sizable magnetic forces generated by a short circuit or fault, also unlatches, or trips, the operating mechanism.

Miniature circuit breakers use bimetals or analog circuits to provide overload (thermal) protection. Bimetals do a good job of simulating thermal cooling of power conductors. The bimetal trips a circuit breaker when its temperature reaches a certain predetermined value. Most of today's circuit breakers are not ambient temperature compensated.

UL 489 is a molded case circuit breaker standard that controls tripping characteristics. For a circuit breaker rated at, for example, 30 A or less, the following performance is required at three different current levels relative to the rated current: (1) 200%: tripping in greater than 12 seconds but less than 2 minutes; (2) 135%: tripping in less than 1 hour; and (3) 100%: no tripping.

Analog circuits can simulate cooling using charge stored on a capacitor, which is simply reset to a fixed thermal level after a trip. See, for example, U.S. Pat. No. 5,418,677.

Some analog circuits may use the temperature of an internal shunt for tripping, but this technique suffers from ambient temperature calibration issues or inaccuracies at the, above, 135% must trip setting of UL 489.

Accordingly, there is room for improvement in circuit interrupters.

SUMMARY OF THE INVENTION

These needs and others are met by embodiments of the invention, which provide a circuit interrupter including a processor having a thermal overload predictive function, and a shunt wire structured to measure current flowing through separable contacts for the thermal overload predictive function.

In accordance with one aspect of the invention, a circuit interrupter comprises: separable contacts; an operating mechanism structured to open and close the separable contacts; a processor including a thermal overload predictive function; and a shunt wire in series with the separable contacts and being structured to measure current flowing through the separable contacts for the thermal overload predictive function.

The processor may further include an arc fault circuit interrupter function, and the shunt wire may also measure the current flowing through the separable contacts for the arc fault circuit interrupter function.

The processor may further include a non-linear ambient temperature compensation function applied to the thermal overload predictive function.

The thermal overload predictive function may include a diode temperature sensor cooperating with the shunt wire, and a nonvolatile memory saving ambient calibration information for the diode temperature sensor.

The diode temperature sensor may be proximate the shunt wire.

As another aspect of the invention, a circuit interrupter comprises: separable contacts; an operating mechanism structured to open and close the separable contacts; a processor including a thermal overload predictive function and an arc fault circuit interrupter function; and a shunt wire in series with the separable contacts and being structured to measure current flowing through the separable contacts for both of the thermal overload predictive function and the arc fault circuit interrupter function.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is described in association with a miniature circuit breaker, although the invention is applicable to a wide range of circuit interrupters.

Figure 1:
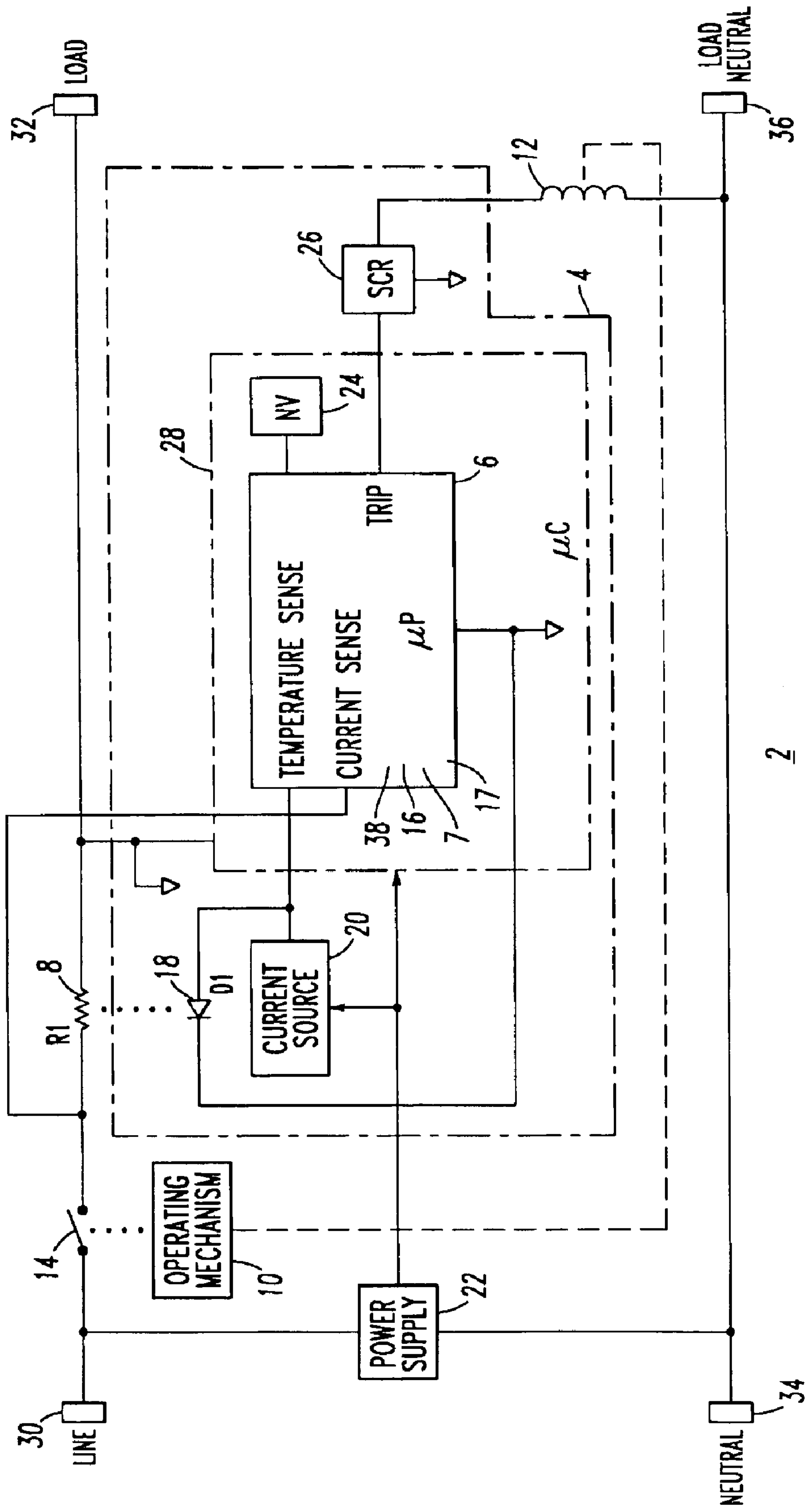
FIG. 1 is a block diagram in schematic form of a circuit breaker in accordance with an embodiment of the invention.

FIG. 1 shows a circuit interrupter, such as a miniature circuit breaker 2, including a protective electronic circuit 4 having a processor, such as microprocessor (μP) 6. For example, for an arc fault circuit interrupter (AFCI) function 7, the protective electronic circuit 4 senses current (e.g., Ishunt=Vshunt/Rshunt) by measuring the voltage (Vshunt) across a shunt wire (R1) 8 having a known resistance (Rshunt), looks for arcing current signatures, and trips a circuit breaker operating mechanism 10 using a trip solenoid 12 to unlatch separable contacts 14. As another example, an electronic ground fault protection function 16 may also be included if a ground fault (GF) sensing current transformer (CT) (not shown) is added with appropriate analog signal amplification (not shown) for input by the μP 6.

The protective electronic circuit 4 and, more particularly, the μP 6, may include one or both of an arc fault protection circuit and a ground fault protection circuit. Alternatively, other suitable trip circuit(s) may be employed. Non-limiting examples of arc fault detectors are disclosed, for instance, in U.S. Pat. No. 5,224,006, with a preferred type described in U.S. Pat. No. 5,691,869, which is hereby incorporated by reference herein. Non-limiting examples of ground fault detectors are disclosed in U.S. Pat. Nos. 5,293,522; 5,260,676; 4,081,852; and 3,736,468, which are hereby incorporated by reference herein.

The example electronic circuit 4 provides a "thermal overload" predictive function 17 through the μP 6. A temperature sensor (e.g., without limitation, a diode (D1) 18, which is driven by a suitable predetermined low level current from current source 20) is used to measure the temperature of the shunt wire (R1) 8 (with suitably close thermal coupling of the shunt wire (R1) 8 to diode (D1) 18 being employed).

A suitable power supply 22 (e.g., alternating current to direct current) supplies power to the current source 20 and a microcomputer (μC) 28. The μC 28 includes the μP 6 and a nonvolatile (NV) memory 24, and may also optionally include an ambient temperature sensing circuit (not shown), although such a circuit is not required. The μP 6 drives an SCR 26 that energizes the coil of the trip solenoid 12 to trip open the separable contacts 14 through the operating mechanism 10. The separable contacts 14 are electrically connected in series with the shunt wire (R1) 8 between a line terminal 30 and a load terminal 32. The power supply 22 is powered from a line-to-neutral voltage between the line terminal 30 and a line neutral terminal 34, which is electrically connected to a load neutral terminal 36.

EXAMPLE 1

For example, at the time of manufacture and test of the electronic circuit 4, the ambient temperature and the corresponding forward voltage of the diode (D1) 18, as measured by μP 6 from the anode of diode (D1) 18 with no current in the shunt wire (R1) 8, are measured and saved in the μC NV memory 24. Diodes, such as diode (D1) 18, have a very predictable and stable negative voltage temperature coefficient (e.g., without limitation, about −2.2 mV/° C.) when biased with a suitable small fixed current (e.g., without limitation, on the order of about 100 μA) from the example current source 20.

EXAMPLE 2

The shunt wire (R1) 8 is selected to thermally match the UL 489 protection points of 135% and 200%. The shunt wire (R1) 8 is selected to be about the same wire gauge as that of the power circuit (not shown) being protected, but generally with a relatively higher temperature insulation rating, in order that its thermal mass slows the temperature rise of that shunt. For example, when 200% current is applied, the temperature of the shunt wire (R1) 8 (and the corresponding voltage of the diode (D1) 18) reaches the trip temperature, which trips the circuit breaker 2 based upon the sensed temperature (and the corresponding sensed voltage), in about 15 seconds which is within the UL 489 limits.

At a fixed level of current (I), the power dissipation in the shunt wire 8 is $P=(I^2R)$ (watts), wherein R is the resistance value of the shunt wire 8. This power dissipation causes a temperature rise $T_r$ of the shunt wire 8 wherein: (1) the "rate of temperature rise" is determined by the thermal capacitance of the shunt "$C_t$" [(joules=watts/second)/° C.] and (2) the final steady state shunt temperature is determined by the ambient temperature and the thermal resistance "$R_t$" (° C./watt) from the shunt to the ambient. The temperature of the shunt is thus $T_{shunt}=[P*R_t]*(1-e^{-t/RtCt})$ wherein: $T_{shunt}$ is the temperature rise above ambient.

$T_{trip}$ is the shunt temperature rise above ambient when tripping occurs. Equations 1 and 2 show $T_{trip}$ for the ultimate (chosen or 115%) trip point and the 200% trip point, respectively.

$$T_{trip}=(P_{@I=115\%})*R_t=[R*(I\text{rated}*1.15)^2]*R_t \quad \text{(Eq. 1)}$$

$$T_{trip}=(P_{@I=200\%})*R_t=[R*(I\text{rated}*2.00)^2]*R_t*(1-e^{-t@200\%/RtCt}) \quad \text{(Eq. 2)}$$

wherein:

t@200% is chosen, for example, to be 38 seconds ($\cong\sqrt{(12*120)}$);

$P_{@I=115\%}$ is the power at 115% rated current; and $P_{@I=200\%}$ is the power at 200% rated current.

Solving Equations 1 and 2 for RtCt with $T_{trip}$ being constant yields RtCt≅95 seconds. Similarly, Equation 3 shows $T_{trip}$ for the 135% trip point.

$$T_{trip}=(P_{@I=135\%})*R_t=[R*(I\text{rated}*1.35)^2]*R_t*(1-e^{-t@135\%/RtCt}) \quad \text{(Eq. 3)}$$

Using RtCt=95 seconds and solving Equations 1 and 3 for t@135% yields RtCt≅123 seconds. Thus, the nominal trip time at 200% rated current is 38 seconds and the nominal trip time at 135% rated current is about 123 seconds.

Any other trip equations are of the form: $T_{trip}=K*\text{Irated}^2*[1-e^{-t/RtCt}]$, wherein RtCt is the thermal time constant of the shunt wire 8 in the ambient, $K=R*PCT^2R_t$ and PCT is the corresponding percentage of rated current. Except for the case where PCT is 115% of rated (ultimate trip point) current, where the circuit breaker 2 waits as long as it takes to trip, "t" is relatively very large and $e^{-t/RtCt}$ is about zero. Also, since the load current is sensed from the voltage across the shunt wire (R1) 8, the electronic overload trip can, for example, be inhibited for currents of less than about 110%.

EXAMPLE 3

A conventional bimetal (not shown) trips a conventional circuit breaker (not shown) at a certain temperature, To, at, for example, 115% of rated current. The heat required to get the bimetal to that temperature is shown in Equation 4.

$$[I(115\%)]^2*[R\text{bimetal}]=K(To-T\text{ambient}) \quad \text{(Eq. 4)}$$

wherein:

Rbimetal is the bimetal resistance;

K is a gain factor (W/° C.);

To is the trip temperature (° C.); and

Tambient is the ambient temperature (° C.).

As a further example, if To is 200° C. and the ambient temperature rises from 25° C. to 65° C., then the circuit breaker trip current level will decrease from 115% to about 101% ($=\sqrt{[(115^2)*(200-65)/(200-25)]}$) from Equation 4. Thus, such a conventional circuit breaker may not be able to carry about 100% rated current in a relatively hot environment. However, since the μP 6 of FIG. 1 knows that the load current flowing through shunt wire (R1) 8 is less than 110%, it can inhibit tripping unless the current exceeds 110% indefinitely (e.g., for several cycles).

EXAMPLE 4

For thermal overload conditions at about 135% of rated current, the power circuit ambient somewhat tracks the temperature rise of the shunt wire (R1) 8. Therefore, if ambient temperature compensation is to be used, then it needs to be a non-linear function desensitizing the ambient temperature effects.

For example, the circuit breaker 2 may be hot because its load center (not shown) is located in Phoenix, Ariz. on the south side of a house (not shown) on a sunny day. Hence, high ambient temperatures do not necessarily mean that the power circuit conductor (not shown), which is electrically connected to the load terminal 32 and in series with the shunt wire (R1) 8, to be protected is also hot. Thus, ambient compensation, if used, should only be enabled at temperatures above about 40° C., which is the listed breaker operating temperature, and be just sufficient to prevent nuisance tripping. Here, the desired non-linear function is easily incorporated into the μP protective functions 7,16 with, for example, a predetermined table lookup in the NV memory 24.

As an example, if the ambient temperature is below 40° C. as measured by a circuit (not shown) either internal to the μC 28 or on the μC circuit board, then no compensation is made. However, if the ambient temperature is 65° C., then the trip level temperature (To) may be raised by about a 20° C. setpoint limit, since some of the ambient temperature rise may be due to the load current power dissipation in components other than, but also including, the shunt wire 8.

EXAMPLE 5

For example, the exact thermal gain of the diode (D1) 18 can be measured at the time of manufacture of the electronic circuit 4 by heating diode (D1) 18 to a known temperature above ambient temperature with a known forward current passing therethrough, reading the forward voltage, calculating the gain factor, and storing that gain factor (e.g., without limitation, k equal to about −2.2 mV/° C.) in μP NV memory 24. This is shown from Equation 5:

$$k=(V_1-V_A)/(T_1-T_A) \quad \text{(Eq. 5)}$$

wherein:

$T_A$ is a predetermined ambient temperature stored in NV memory 24 at the time of manufacture;

$V_A$ is a measured voltage across the diode (D1) 18 and stored in NV memory 24, which measured voltage corresponds to the predetermined ambient temperature;

$T_1$ is a measured temperature, which need not be stored in NV memory 24; this measured temperature $T_1$ is suitably greater than $T_A$; and $V_1$ is a measured voltage across the diode (D1) 18, which need not be stored in NV memory 24, this measured voltage $V_1$ corresponds to the measured temperature $T_1$.

Also, if the ambient temperature, $T_A$, is known and the temperature sensor is a diode, such as D1 18, then a difference voltage is needed including the forward voltage at a fixed temperature. This forward voltage, $V_A$, at the fixed temperature, $T_A$, is saved in the NV memory 24 at the time of manufacture or test. In this manner, only fixed constants, $V_A$, $T_A$ and k, possibly determined at the time of manufacture or test, need to be stored in NV memory 24. The temperature as a function of diode forward voltage is shown in Equation 6:

$$T_X=T_A+(V_X-V_A)/k \quad \text{(Eq. 6)}$$

wherein:

$V_X$ is a measured voltage across the diode (D1) 18; and $T_X$ is the calculated temperature corresponding to that measured voltage.

The temperature rise of the shunt wire (R1) 8 is proportional to the power dissipation (i.e., $(\text{Ishunt})^2\text{Rshunt}$) and thus $V_X$ will be related to $T_X$ or the $I^2R$ heating of the wires (i.e., the shunt wire (R1) 8 and also the power conductor or wire to be protected).

Table 1, below, defines a set of thermal overload conditions for a circuit breaker (not shown) as defined by UL 489 (molded case circuit breaker standard) section 7.1.2 "Calibration Tests".

TABLE 1

| Ishunt | Time (t) at Ishunt value | Trip? |
|---|---|---|
| =200% | 12 seconds < t < 120 seconds | yes |
| =200% | t < 12 seconds | no |
| =135% | t < 60 minutes | yes |
| <=110% | must not trip | no |

EXAMPLE 6

Figure 2:
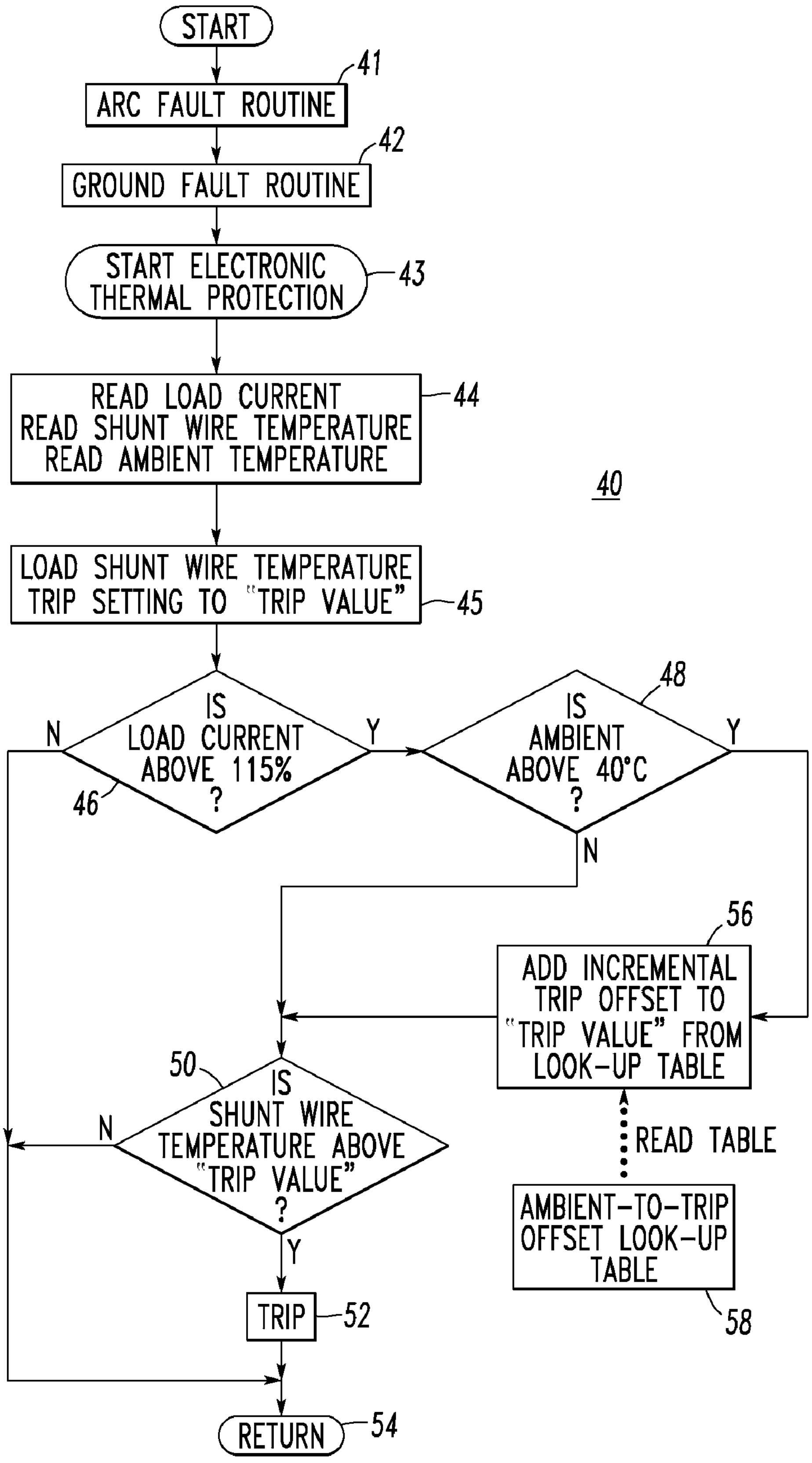
FIG. 2 is a flowchart of a trip routine for the microcomputer of FIG. 1.

Referring to FIG. 2, a trip routine 40 for the μC 28 of FIG. 1 is shown. Although not required, the trip routine 40 may include one or both of an arc fault trip routine 41 and a ground fault trip routine 42. Next, at 43, is the start of an electronic thermal protection routine, which provides a thermal overload predictive function. At 44, the load current (current sense), the shunt wire temperature (temperature sense) and the ambient temperature are read. The load current is determined from the voltage of the shunt wire (R1) 8. The shunt wire temperature is determined from the forward voltage of the diode (D1) 18. The ambient temperature may be determined from a suitable ambient temperature sensor (not shown) or, optionally, is ignored. In the latter case, steps 48 and 56 are not employed.

Next, at 45, the value "Trip Value" is set from a shunt wire temperature trip setting, as will be discussed, below. Then, at 46, it is determined if the load current is above 115% of rated current. Here, the voltage of the shunt wire (R1) 8 divided by its known resistance is compared to 115% times the predetermined rated current. Alternatively, it is determined if the voltage of the shunt wire (R1) 8 is greater than a predetermined value (115% times the predetermined rated current times the known resistance of the shunt wire 8). If this test is not met, then the routine 40 returns at 54. Otherwise, at 48, it is determined if the ambient temperature is greater than 40° C. If not, then at 50, it is determined if the temperature of the shunt wire (R1) 8 as represented by the voltage of the diode (D1) 18 is greater than the "Trip Value". If so, then the trip signal is output to the SCR 26 (FIG. 1) at 52, before the routine 40 returns at 54. Otherwise, the routine 40 returns at 54.

If ambient temperature compensation is optionally employed, and if the ambient temperature is greater than 40° C. at 48, then a suitable incremental trip offset is added to the "Trip Value" from, for example, a look-up table 58 in NV 24 (FIG. 1). The look-up table 58 maintains a suitable mapping of ambient temperature versus incremental trip offset. After either 48 or 56, step 50 is executed as was discussed above.

In the routine 40, the "Trip Value" is preferably determined experimentally for a reference circuit (not shown) using a reference diode (not shown). Then, that experimental "trip value" is preferably adjusted at the time of manufacture of a particular circuit interrupter by measuring the forward voltage of the diode (D1) 18 at 25° C. This assumes that: (1) the diode forward voltage at 25° C. may vary from diode to diode; and (2) the diode forward voltage temperature coefficient will be uniform from diode to diode. Also, the temperature of the shunt wire 8 at the trip point is a fixed number. The "Trip Value" is determined from Equations 7 and 8, as follows:

$$V_X=[V_{X(135\%)}-V_{X(25)}] \quad \text{(Eq. 7)}$$

wherein:

$V_X$ is a "delta trip temperature" voltage value of the reference diode, and is assumed to be a fixed value from circuit interrupter to circuit interrupter;

$V_{X(135\%)}$ is the trip voltage value of the reference diode at 135% rated current and at 25° C. ambient for the reference diode; and $V_{X(25)}$ is the diode forward voltage at 25° C. ambient for the reference diode.

$$V_Y=[V_{Y(25)}+V_X] \quad \text{(Eq. 8)}$$

wherein:

$V_{Y(25)}$ is the diode forward voltage, which may vary from circuit interrupter to circuit interrupter, at 25° C. ambient for a particular diode such as diode (D1) 18; and $V_Y$ is the trip voltage value ("Trip Value") for a particular diode such as diode (D1) 18.

The disclosed circuit breaker 2 provides a simplified and relatively more accurate calibration process than known prior circuit breakers. No mechanical moving parts are employed other than the trip solenoid 12 and the operating mechanism 10. This provides material and calibration cost savings and a relatively easier assembly process. The power dissipation of the prior bimetal (not shown) is no longer needed, but is replaced by the shunt wire (R1) 8 power dissipation, which may be employed for other protective functions. For example, in an arc fault circuit interrupter (AFCI), this can almost halve the load current associated circuit breaker losses (i.e., the bimetal resistance is about the same value as the resistance of the shunt wire (R1) 8 used to sense current for the AFCI function 7). In an AFCI circuit breaker with a bimetal (not shown) and a shunt wire (not shown), both the bimetal and the shunt wire dissipate about the same amount of power. Thus, eliminating the bimetal halves the power dissipation.

Using the μP 6 with the NV memory 24 enables the use of the internal shunt wire (R1) 8 to sense overload and cooling off conditions. This μP 6 has the benefit of being able to simply measure and store ambient calibration values at the time of manufacture of the electronic circuit 4. Additionally, a non-linear response (e.g., without limitation, a lookup table) to ambient temperatures is stored in the NV memory 24 to more accurately match the UL 489 135% tripping requirements. Thus, if the resistance of the shunt wire (R1) 8 with an equivalent thermal time constant is used, then an electronic trip can be issued when the shunt wire (R1) 8 reaches a predetermined fixed trip temperature.

Although separable contacts 14 are disclosed, suitable solid state separable contacts may be employed. For example, the disclosed circuit breaker 2 includes a suitable circuit interrupter mechanism, such as the separable contacts 14 that are opened and closed by the operating mechanism 10, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:

separable contacts;

an operating mechanism structured to open and close said separable contacts;

a processor including a thermal overload predictive function;

a shunt wire in series with said separable contacts and being structured to measure current flowing through said separable contacts for said thermal overload predictive function;

a temperature sensor structured to measure the temperature of said shunt wire, wherein said thermal overload predictive function receives said measured current and said measured temperature of said shunt wire, wherein said processor responsive to said thermal overload predictive function is structured to cause said operating mechanism to trip open said separable contacts in response to said measured current and said measured temperature of said shunt wire; and wherein said separable contacts are structured to be electrically connected in series with a power circuit including a power circuit wire having a wire gauge; wherein said shunt wire has about the same wire gauge as said power circuit wire; and wherein said processor responds to said thermal overload predictive function to cause said operating mechanism to trip open said separable contacts when said thermal overload predictive function determines that said measured current is greater than a first predetermined value, and that said measured temperature of said shunt wire is greater than a second predetermined value.

2. The circuit interrupter of claim 1 wherein said circuit interrupter has a rated current; and wherein said shunt wire is selected to cause said separable contacts to be tripped open when said measured current is 200% of said rated current for a first time of between 12 and 120 seconds, or when said measured current is 135% of said rated current for a second time of less than 60 minutes.

3. The circuit interrupter of claim 2 wherein said shunt wire is further selected to not cause said separable contacts to be tripped open when said measured current is 200% of said rated current for a third time of less than 12 seconds, or when said measured current is less than or equal to 115% of said rated current.

* * * * *